United States Patent
Lee

(10) Patent No.: US 10,184,529 B2
(45) Date of Patent: Jan. 22, 2019

(54) WEDGE CLUTCH ASSEMBLY

(71) Applicant: Schaeffler Technologies AG & Co. KG, Herzogenaurach (DE)

(72) Inventor: Brian Lee, York, SC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 303 days.

(21) Appl. No.: 15/168,986

(22) Filed: May 31, 2016

(65) Prior Publication Data

US 2017/0343058 A1    Nov. 30, 2017

(51) Int. Cl.

| F16D 27/102 | (2006.01) |
|---|---|
| F16D 15/00 | (2006.01) |
| F16D 13/06 | (2006.01) |
| F16D 23/12 | (2006.01) |
| F16D 41/08 | (2006.01) |
| F16D 41/063 | (2006.01) |

(52) U.S. Cl.
CPC .......... *F16D 27/102* (2013.01); *F16D 13/06* (2013.01); *F16D 15/00* (2013.01); *F16D 41/063* (2013.01); *F16D 41/082* (2013.01); *F16D 2023/123* (2013.01)

(58) Field of Classification Search
CPC ........ F16D 13/06; F16D 15/00; F16D 41/063; F16D 41/082; F16D 2023/123; F16D 27/102; F16D 27/14
See application file for complete search history.

(56) References Cited

U.S. PATENT DOCUMENTS

| 9,644,690 B2* | 5/2017 | Lee | F16D 43/00 |
|---|---|---|---|
| 9,718,354 B2* | 8/2017 | Lee | B60K 17/35 |
| 9,915,300 B2* | 3/2018 | Guettinger | F16D 41/063 |
| 2014/0231208 A1* | 8/2014 | Lee | F16D 21/00 |
| | | | 192/48.5 |
| 2016/0091034 A1* | 3/2016 | Lee | F16D 23/12 |
| | | | 192/35 |
| 2016/0238090 A1* | 8/2016 | Spencer | F16D 27/10 |
| 2017/0089405 A1* | 3/2017 | Lee | F16D 15/00 |

* cited by examiner

*Primary Examiner* — Richard M Lorence
(74) *Attorney, Agent, or Firm* — Brooks Kushman P.C.

(57) ABSTRACT

A wedge clutch assembly for transferring torque from an engine to an output shaft, comprising a clutch carrier comprising an axial friction surface and a radially inwardly facing surface, a hub comprising a first radially outwardly facing surface having grooves positioned circumferentially thereon and detents positioned within the grooves, a wedge plate comprising an axial friction surface, a second radially outwardly facing surface, and a second radially inwardly facing surface having recesses, a pressure plate concentrically arranged within the first radially inwardly facing surface and displaceable such that in an engaged mode, an axial force is applied to the pressure plate, in a first axial direction, to engage the wedge plate with the clutch carrier such that torque is transferred from the engine to the output shaft, and in a disengaged mode, the wedge plate is independently rotatable from the clutch carrier.

16 Claims, 7 Drawing Sheets

WEDGE CLUTCH ASSEMBLY

FIELD

The present disclosure relates generally to clutch discs, more particularly to a wedge clutch assembly having detents.

BACKGROUND

A clutch is a mechanical device that engages and disengages the power transmission, especially from driving shaft to driven shaft. Clutches are used whenever the transmission of power or motion must be controlled either in amount or over time (e.g., clutches control whether automobiles transmit engine power to the wheels). Typically, a friction clutch consists of at least a flywheel, which is connected to the engine through an input shaft, a clutch disc, which is connected to the gearbox (e.g., transmission) through an output shaft, a pressure plate, and an actuator. To engage the clutch, the actuator provides pressure to the pressure plate to force the friction surface of the clutch disc tightly against the friction surface of the rotating flywheel. The contact between the friction surfaces causes the clutch disc to rotate and provide power to the gearbox. To disengage, the pressure is removed from pressure plate, which in turn releases the clutch disc from contact with the flywheel. The main components of a clutch disc are the wedge plate and a splined hub, but are often fitted with dampers.

Electrodynamics is the creation of a magnetic field from an electric current. When electricity passed through a wire, a magnetic field is created around the wire. Looping the wire increases the magnetic field. Adding an iron core greatly increases the magnetic effect and creates an electromagnet.

Wedge-based clutches are advantageous because they feature a self-reinforcement function and produce a large normal force from a small actuation force. As a result, a wedge clutch can be space-saving and energy-saving. Wedge clutches that use a tapered (conic) surface between the hub and wedge plate can be problematic. Under torque, the tapered surface has the tendency to cause the hub, which has been displaced axially into engagement to lock the wedge clutch, to be forced back out of engagement due to the reaction forces as a result of the angled surface. Eliminating the need for this tapered surface would remove this issue. Eliminating the tapered surface would also reduce the axial displacement needed to actuate the wedge clutch and the energy needed for the axial displacement, which would allow an electromagnet powered by a low voltage battery to actuate the clutch.

It therefore is an object of the disclosure to provide a wedge clutch disc assembly having detents, where the wedge clutch disc assembly can be actuated using an electromagnet.

SUMMARY

According to aspects illustrated herein, there is provided a wedge clutch assembly for transferring torque from an engine to an output shaft, comprising a clutch carrier operatively arranged to receive torque from the engine, the clutch carrier comprising a first axial friction surface and a first radially inwardly facing surface, a hub operatively arranged to non-rotatably lock with the output shaft, the hub comprising a first radially outwardly facing surface having one or more grooves positioned circumferentially thereon and one or more detents positioned within the one or more grooves, the first radially outwardly facing surface comprising a first plurality of arc surfaces, a wedge plate comprising at least one axial friction surface, a second radially outwardly facing surface, and a second radially inwardly facing surface having one or more recesses and a second plurality of arc surfaces, the one or more recesses operatively arranged to align with the one or more detents, a pressure plate concentrically arranged within the first radially inwardly facing surface and displaceable such that in an engaged mode, an axial force is applied to the pressure plate, in a first axial direction, to engage the wedge plate with the clutch carrier such that torque is transferred from the engine to the output shaft, and in a disengaged mode, the wedge plate is independently rotatable from the clutch carrier.

According to aspects illustrated herein, there is provided an electromagnetic actuator, the actuator comprises an electromagnet, comprising a core and a coil concentrically arranged within the core, an armature, a support tube, comprising a first end having an axial surface, the axial surface having a concentric groove, and a second end having a neck, a thrust bearing operatively arranged within the groove to engage the pressure plate, an actuator spring concentrically arranged around the neck, a spring tube, comprising a first end concentrically arranged around the actuator spring, and a second end fixedly secured to the armature, in the disengaged mode, an axially disposed space separates the armature from the core, and in the engaged mode, the armature is displaced in the first axial direction to abut against the core.

These and other objects, features, and advantages of the present invention will become readily apparent upon a review of the following detailed description of the invention, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the invention. It is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention.

Unless defined otherwise, all technical and scientific terms used herein have the same meaning as commonly understood to one of ordinary skill in the art to which this invention pertains. It should be understood that any methods, devices or materials similar or equivalent to those described herein can be used in the practice or testing of the invention. The assembly of the present invention could be driven by hydraulics, electronics, and/or pneumatics.

It should be appreciated that the term "substantially" is synonymous with terms such as "nearly," "very nearly," "about," "approximately," "around," "bordering on," "close to," "essentially," "in the neighborhood of" "in the vicinity of" etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

By "non-rotatably connected" elements, we mean that: the elements are connected so that whenever one of the elements rotate, all the elements rotate; and relative rotation between the elements is not possible. Radial and/or axial movement of non-rotatably connected elements with respect to each other is possible, but not required.

Figure 1:
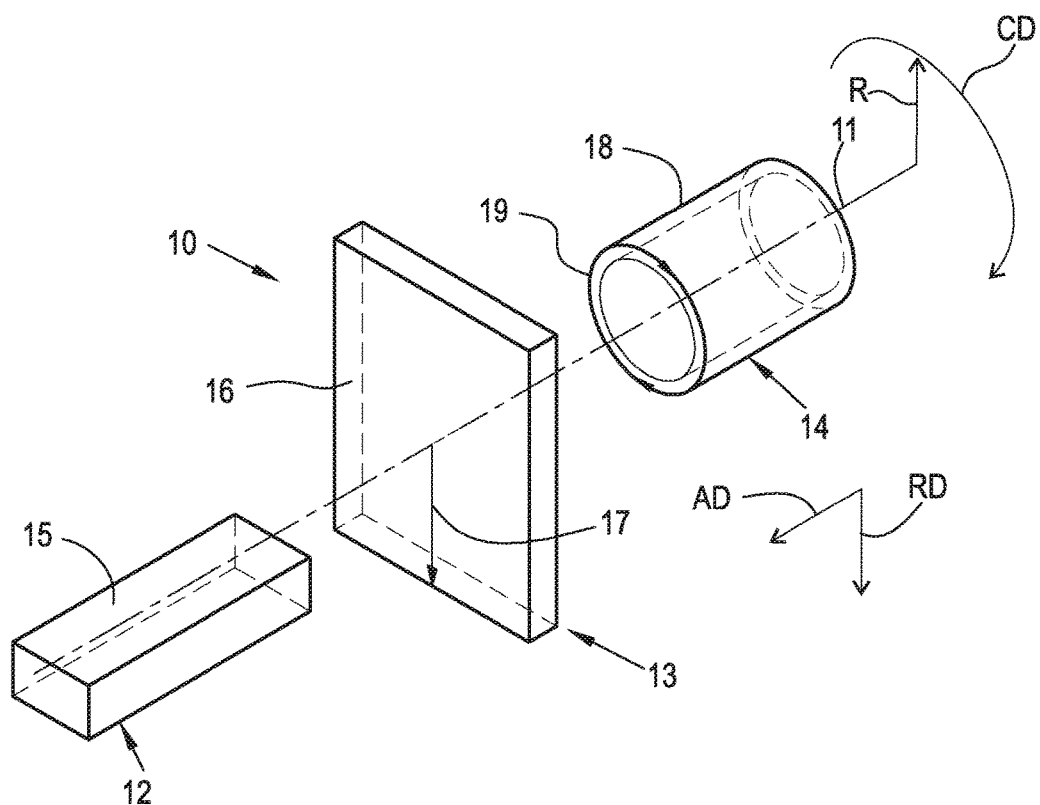
FIG. 1 is a perspective view of a cylindrical coordinate system demonstrating spatial terminology used in the present application.

Adverting now to the figures, FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 22, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
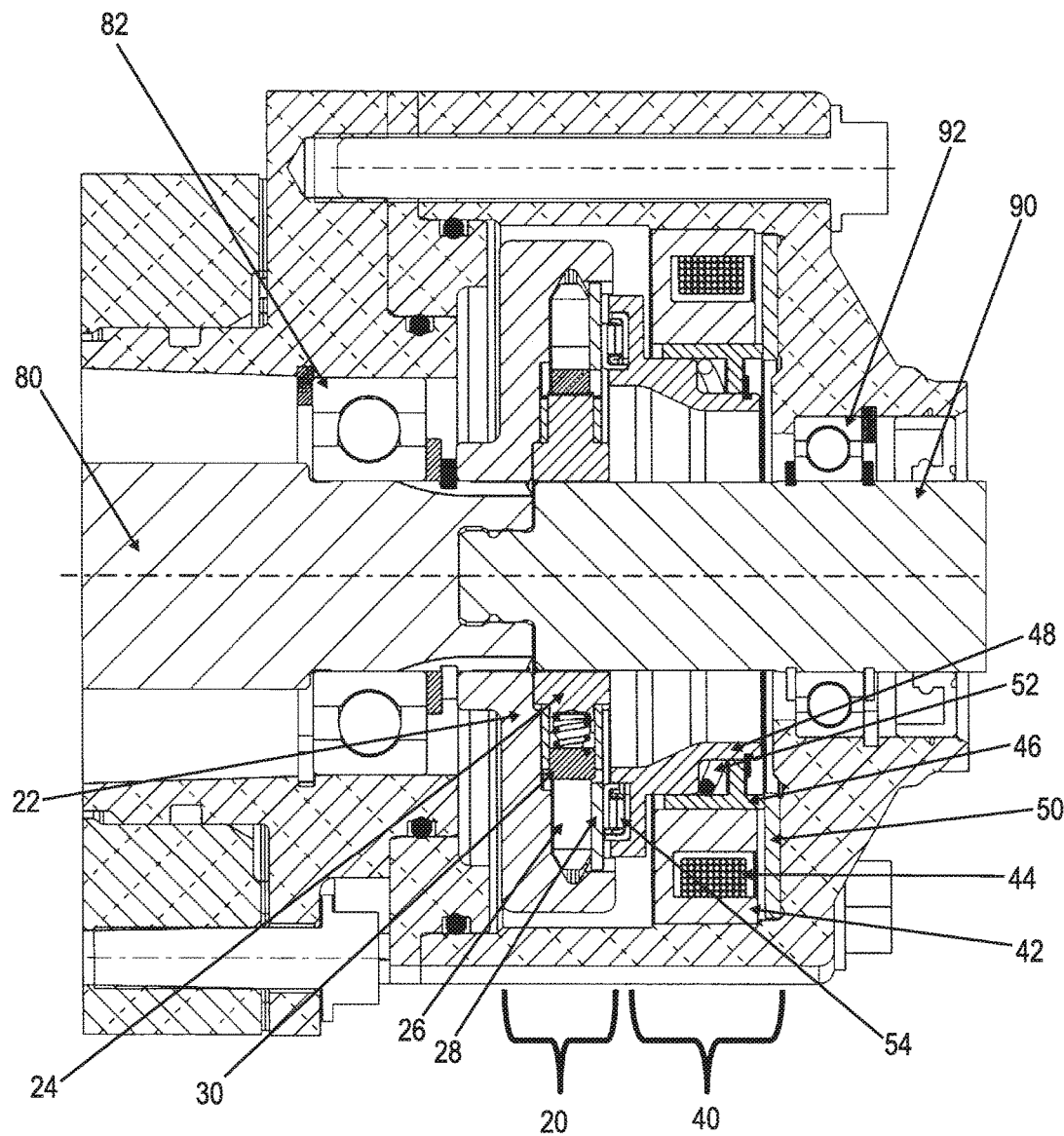
FIG. 2 is a fragmentary cross-sectional side view of a wedge clutch assembly with detents and an electromagnetic actuator inside a housing.

FIG. 2 is a fragmentary cross-sectional side view of wedge clutch assembly 20 with detents 30 and electromagnetic actuator 40 inside a housing. FIG. 2 shows input shaft 80 and output shaft 90 supported by shaft support bearings 82 and 92, respectively. Electromagnetic actuator 40 provides the axial actuation force to engage wedge clutch assembly 20. It should be appreciated, however, that any other suitable means of actuation may be used. For example, the axial actuation force may be applied using hydraulic, pneumatic, mechanical (i.e., pedals or levers), or electrical (electrically actuated components) actuation methods.

Wedge clutch assembly 20 comprises clutch carrier 22, hub 24, one or more detents 30, wedge plate 26, and pressure plate 28. Clutch carrier 22 is a circular tube comprising axial friction surface 60, inward facing radial friction surface 70, and an internal spline surface. Radial friction surface 70 comprises one or more channels arranged axially thereon (see FIG. 4B).

Hub 24 is a circular tube comprising radially outward facing surface 25 having detent slots 36 arranged radially thereon, and hub ramps 24A. Hub ramps 24A are one or more arc surfaces operatively arranged on hub 24 radially outward facing surface 25 to lock hub 24 and wedge plate 26. Hub 24 includes an internal spline surface. Output shaft 90 is splined to hub 24 internal spline surface.

Detents 30 comprise detent springs 32 and detent pins 34. Detents 30 are arranged in detent slots 36 such that detent springs 32 force detent pins 34 to protrude from hub 24 radially outward facing surface 25. Detent springs 32 are any compressive springs capable of maintaining a sufficient radial force between hub 24 and detent pins 34. For example: in the disengaged mode, detent springs 32 provide enough radial outward force to detent pins 34 to engage recesses 38 and prevent wedge plate 26 from rotating relative to hub 24; and in the engaged mode, detent springs 32 sufficiently compress to allow detent pins 34 to fully depress within detent slots 36. Detent pins 34 are rollers, keys, or pins capable of: in the disengaged mode, engaging recesses 38; and in the engaged mode, being fully depressed within detent slots 36 by wedge plate 26. Optional washers 100 are annular plates operatively arranged to prevent detents 30 from displacing axially in detent slots 38.

Wedge plate 26 is an annular plate comprising axial friction surface 62 and outward facing radial friction surface 72. Wedge plate 26 comprises a radially inward facing surface having recesses 38 and wedge plate ramps 26A. Recesses 38 are radially arranged to align with detents 30 such that, during disengaged mode, detent pins 34 engage therein. Wedge plate ramps 26A are one or more arc surfaces operatively arranged on wedge plate 26 radially inward facing surface to lock wedge plate 26 and hub 24. Wedge plate 26 comprises a radially disposed space (i.e., discontinuous in a circumferential direction), to allow wedge plate 26 to expand radially outward such that radial friction surface 72 engages radial friction surface 70. Wedge plate 26 is concentrically arranged within clutch carrier 22. Hub 24 with detents 30 arranged in detent slots 36 is concentrically arranged within wedge plate 26.

Pressure plate 28 is a circular plate concentrically arranged within clutch carrier 22. Pressure plate 28 comprises one or more tabs, which engage clutch carrier 22 one or more channels such that pressure plate 28 and clutch carrier 22 are non-rotatably locked. Pressure plate 28 is operatively arranged to displace axially within clutch carrier 22.

Electromagnetic actuator 40 comprises core 42, coil 44, spring tube 46, support tube 48, armature 50, actuator spring 52, and thrust bearing 54. Core 42 is an annular ring comprising magnetic contact surface 64 having a concentric groove. In an example embodiment, magnetic contact surface 64 further comprises a plurality of return springs 56 operatively arranged to engage armature 50. Return springs 56 return armature 50 in direction AD1 and remove the axial load from pressure plate 28 after the electromagnet is powered down. Coil 44 is concentrically arranged within core 42 concentric groove. Coil 44 is a metal wire capable of conducting electricity and creating a magnetic field such as, for example, copper. Core 42 is a material capable of strengthening the magnetic field created by coil 44 such as, for example, iron. A power supply provides an electric current through coil 44 such that core 42 and coil 44 create an electromagnet, which produces a magnetic field capable of magnetizing armature 50. It should be appreciated, however, that any other suitable means for magnetizing armature 50 may be used.

Armature 50 is an annular plate capable of being magnetized by the electromagnet (i.e., core 42, coil 44, and electric current). Armature 50 and core 42 are arranged concentrically such that: in a disengaged mode, an axially disposed space separates armature 50 from core 42; and in an engaged mode, armature 50 is displaced in axial direction AD2 and abuts against core 42 at magnetic contact surface 64.

Support tube 48 is a circular tube comprising an axial surface end having a concentric groove, and a second end having a neck. Support tube 48 neck comprises an external flange and is operatively arranged to axially engage actuator spring 52.

Thrust bearing 54 is an annular bearing operatively arranged within support tube 48 concentric groove to engage pressure plate 28. Thrust bearing 54 is any type of rotary rolling-element bearing that permits rotation between support tube 48 and pressure plate 28 and supports a predominately axial load between electromagnetic actuator 40 and wedge clutch assembly 20.

Actuator spring 52 is a compression coil spring concentrically arranged around support tube 48 neck. Actuator spring 52 can be any compression coil spring capable of storing energy and, after subsequently releasing it, returning to its natural length. Actuator spring 52 softens the response of the clutch engagement (i.e., pressure plate 28 presses wedge plate 26 tightly against clutch carrier 22) and disengagement (i.e., pressure is removed releasing wedge plate 26 from contact with clutch carrier 22), and maintains a force, and thus contact, between support tube 48 and spring tube 46.

Spring tube 46 is a circular tube comprising an internal flange. Spring tube 46 is concentrically arranged inside core 42 and is fixedly secured to armature 50. Spring tube 46 is concentrically arranged around actuator spring 52 such that spring tube 46 internal flange axially engages actuator spring 52.

Figure 3:
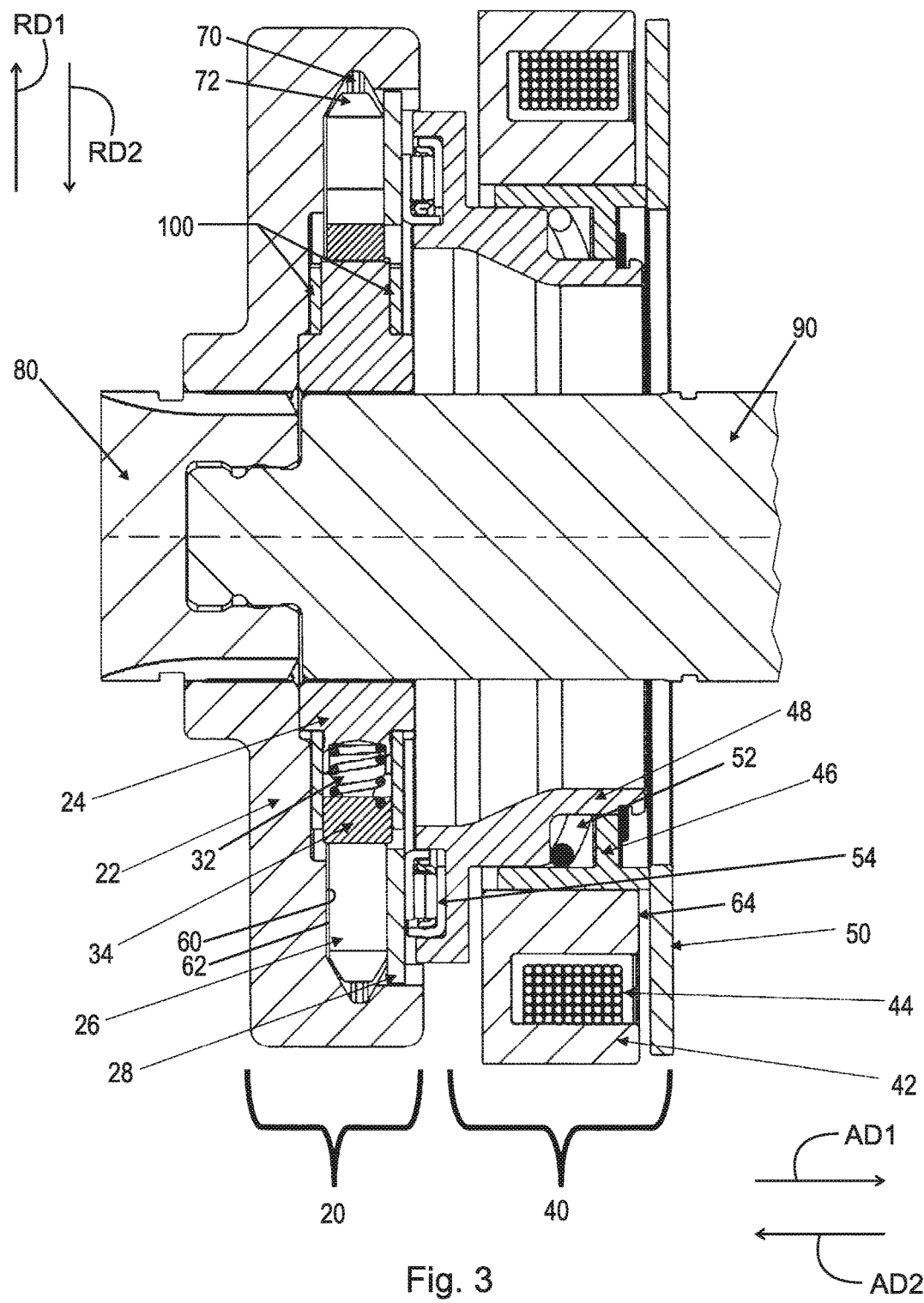
FIG. 3 is a fragmentary cross-sectional side view of the wedge clutch assembly with detents and electromagnetic actuator in FIG. 2.

FIG. 3 is a fragmentary cross-sectional side view of wedge clutch assembly 20 with detents 30 and electromagnetic actuator 40 shown in FIG. 2. Detents 30 comprise detent springs 32 and detent pins 34. It should be appreciated, however, that any other suitable design for detents 30 may be used. Torque enters input shaft 80, which is splined to clutch carrier 22. When electromagnetic actuator 40 is energized, the magnetic field displaces armature 50 (and also spring tube 46) in direction AD2 to abut against core 42 at magnetic contact surface 62, which compresses actuator spring 52 in spring tube 46. Actuator spring 52 reacts against support tube 48, which applies an axial load through thrust bearing 54, into pressure plate 28. Pressure plate 48 and clutch carrier 22 are non-rotatably locked (pressure plate 28 tabs are engaged in clutch carrier 22 channels). The axial load causes pressure plate 28 to press wedge plate axial friction surface 62 against clutch carrier axial friction surface 60, thus creating frictional drag between wedge plate 26 and clutch carrier 22. Frictional engagement occurs when the frictional drag is large enough to circumferentially shift wedge plate 26 to overcome detent springs 32 and depress detent pins 34 into detent slots 36. Hub ramps 24A lock with wedge plate ramps 26A and torque is transferred from input shaft 80 to output shaft 90 (described further with respect to FIGS. 6 and 7 below).

Figure 4:
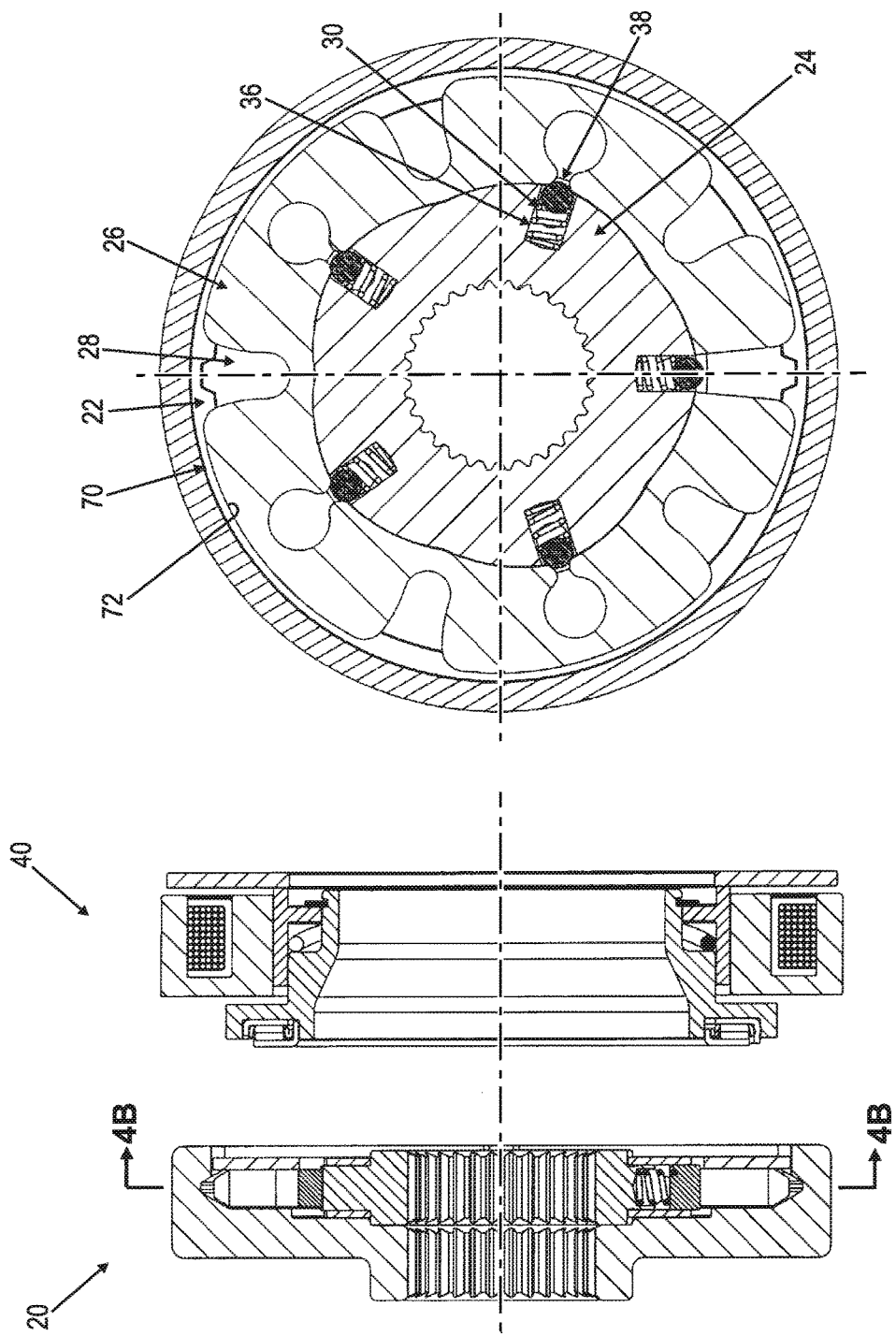
FIG. 4A is a cross-sectional side view of a wedge clutch assembly and an electromagnetic actuation component.
FIG. 4B is a cross-sectional view of the wedge clutch assembly, in disengaged mode, taken along line 4B-4B in FIG. 4A.

FIG. 4A is a cross-sectional side view of wedge clutch assembly 20 and electromagnetic actuator 40 as separate components. FIG. 4B is a cross-sectional view of wedge clutch assembly 20, in disengaged mode, taken along line 4B-4B in FIG. 4A. Wedge clutch assembly 20 comprises single wedge plate 26 including a straight, un-tapered, inner profile surface, clutch carrier 22, hub 24 having a straight, un-tapered, outer profile surface to closely conform to wedge plate 26 inner profile surface, and detent slots 36 for detents 30. Detents 30 comprise springs 32 and detent pins 34. Detent pins 34 are rollers, keys, or pins. Detent pins 34 are forced radially outward by detent springs 32 such that they protrude from the effective outer diameter of hub 24 to engage recesses 38. Detent pins 34 prevent wedge plate 26 from rotating relative to hub 24 until sufficient tangential force is applied to detent pins 34 to compress detent springs 32. In disengaged mode, wedge plate 26 and clutch carrier 22 are not frictionally engaged. It should be appreciated that, in disengaged mode, contact between axial friction surfaces 62 and 60 can occur and create frictional drag between wedge plate 26 and clutch carrier 22. Frictional drag is a circumferential force. However, any contact between axial friction surfaces 62 and 60 in disengaged mode will not create enough frictional drag between wedge plate 26 and clutch carrier 22 to generate frictional engagement. Further, no contact occurs, and thus no frictional drag is created, between wedge plate outward facing radial friction surface 72 and clutch carrier inward facing radial friction surface.

Figure 5:
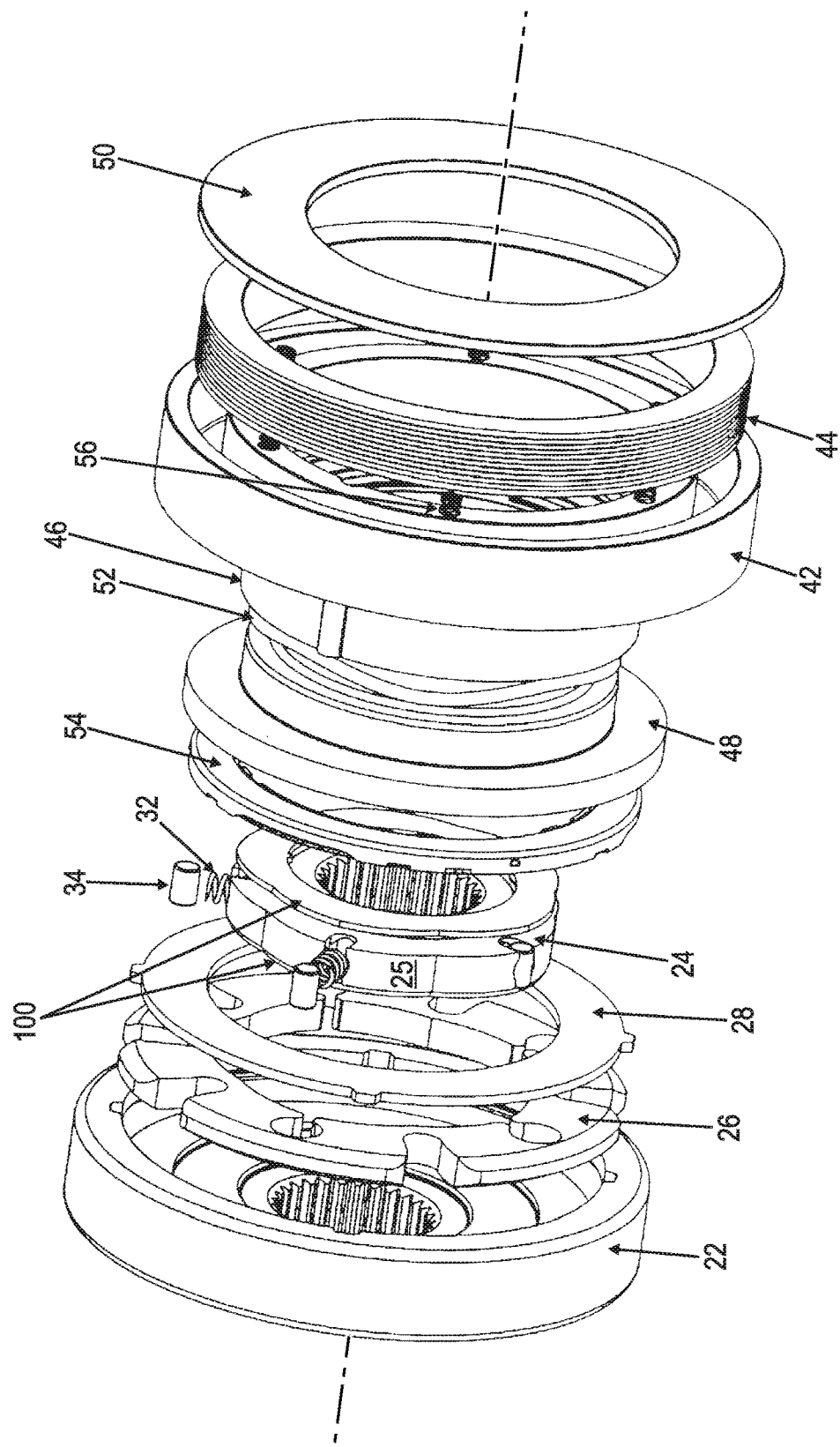
FIG. 5 is an exploded perspective view of the wedge clutch assembly with detents and electromagnetic actuator shown in FIG. 4A.

FIG. 5 is an exploded perspective view of wedge clutch assembly 20 with detents 30 and electromagnetic actuator 40 shown in FIG. 4A. Wedge clutch assembly 20 comprises clutch carrier 22, wedge plate 26, pressure plate 28, hub 24, detents 30, and optional washers 100. Detents 30 comprise detent springs 32 and detent pins 34 assembled within detent slots 36. Wedge plate 26, pressure plate 28, hub 24, and optional washers 100 are assembled concentrically within clutch carrier 22. Electromagnetic actuator 40 comprises thrust bearing 54, support tube 48, actuator spring 52, spring tube 46, core 42, coil 44, and armature 50. In an example embodiment, core 42 includes return springs 56 arranged on magnetic contact surface 60 to return armature 50 in direction AD1 and remove the axial load on pressure plate 28. It should be appreciated that when wedge clutch assembly 20 and electromagnetic actuator 40 are fully assembled, clutch carrier 22, wedge plate 26, pressure plate 28, hub 24, optional washers 100, thrust bearing 54, support tube 48, actuator spring 52, spring tube 46, core 42, coil 44, and armature 50 are concentrically arranged about an axis of rotation (see FIG. 3).

Figure 6B:
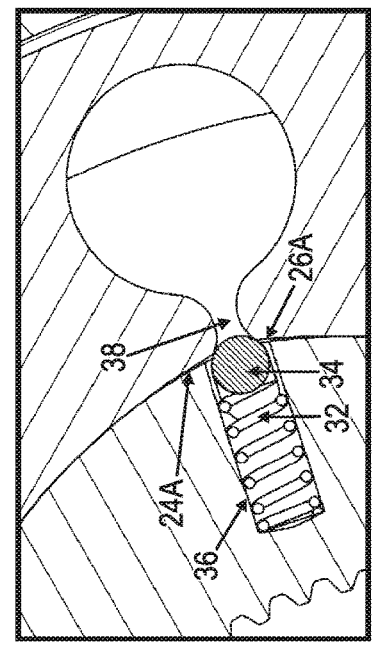
FIG. 6B is an enlarged view of the detail shown in FIG. 6A.
Figure 6A:
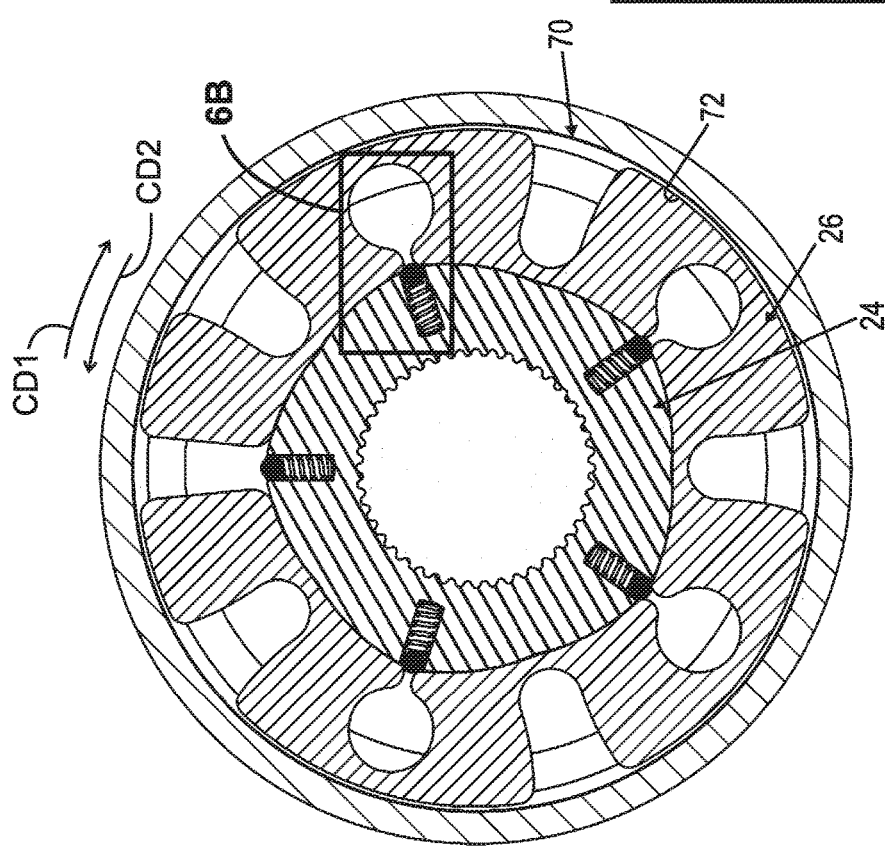
FIG. 6A is a cross-sectional view of a wedge clutch assembly with detents in a disengaged mode.

FIG. 6A is a cross-sectional view of wedge clutch assembly 20 with detents 30 in a disengaged (or neutral) position. Wedge clutch assembly 20 is disengaged when no power is provided to electromagnetic actuator 40 and no axial load is applied to pressure plate 28. FIG. 6B is an enlarged view of the detail shown in FIG. 6A. FIG. 6B shows detent springs 32 providing radial outward force to detent pins 34 such that they protrude from the effective outer diameter of hub 24 and engage recesses 38. Detents 30 prevent wedge plate ramps 26A from riding hub ramps 24A until enough frictional drag is created to circumferentially displace wedge plate 26.

Figure 7B:
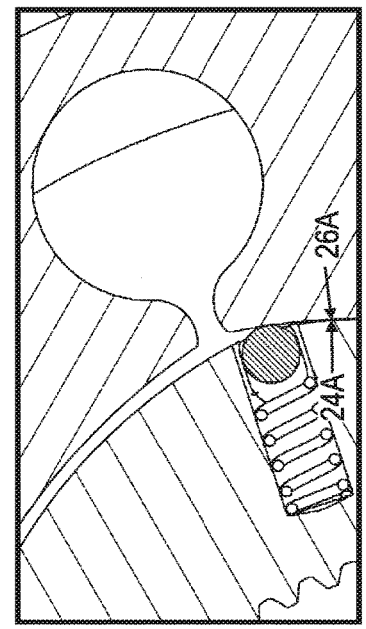
FIG. 7A is a cross-sectional view of a wedge clutch assembly with detents in an engaged position; and, FIG. 7B is an enlarged view of the detail shown in FIG. 7A.
Figure 7A:
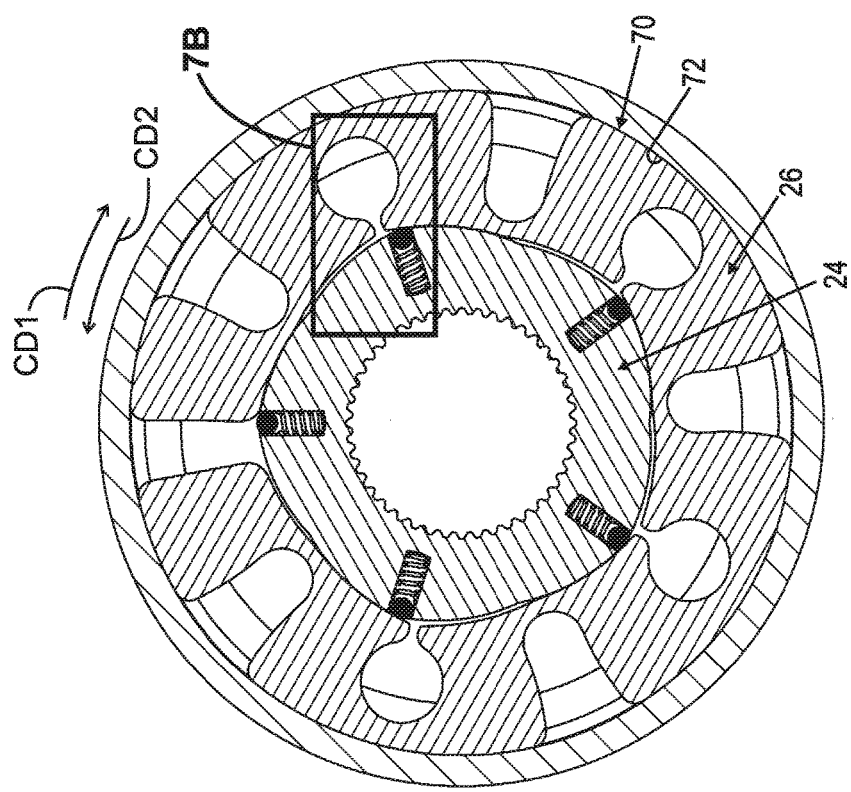

FIG. 7A is a cross-sectional view of wedge clutch assembly 20 with detents 30 in an engaged (or locked) position. When power is supplied to electromagnetic actuator 40, armature 50 is displaced to abut against magnetic contact surface 64 causing pressure plate 28 to squeeze wedge plate 26 against clutch carrier 22. FIG. 7B is an enlarged view of the detail shown in FIG. 7A. FIG. 7B shows detent pins 34 depressed within detent slots 36. Wedge plate 26 is displaced in circumferential direction CD2 such that wedge ramps 26A are riding hub ramps 24A. Hub ramps 24A interfere with wedge ramps 26A such that, when enough frictional drag is created between axial friction surfaces 62 and 60 cause wedge plate 26, wedge plate 26 expands radially outward such that wedge plate outward facing radial friction surface 72 engages clutch carrier inward facing radial friction surface 70. When the power supply is terminated, return springs 56 return armature 50 to its initial position such that the axial load is removed, wedge plate 26 shifts circumferentially in direction CD1, wedge plate ramps 26A unlock from hub ramps 24A, wedge plate 26 contracts, disengaging wedge plate outward facing radial friction surface 72 from clutch carrier inward facing radial friction surface 70, and detent springs 32 force detent pins 34 into recesses 38.

It will be appreciated that various aspects of the above-disclosed invention and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

10 Cylindrical Coordinate System
11 Longitudinal Axis
12 Object
13 Object
14 Object
15 Axial Surface
16 Radial Surface
17 Radius
18 Surface
19 Circumference
20 Wedge Clutch Assembly
22 Clutch Carrier
24 Hub
24A Hub Ramps
25 Hub Radially Outward Facing Surface
26 Wedge Plate
26A Wedge Plate Ramps
28 Pressure Plate
30 Detents
32 Detent Springs
34 Detent Pins
36 Detent Slots
38 Recesses
40 Electromagnetic Actuator
42 Core
44 Coil
46 Spring Tube
48 Support Tube
50 Armature
52 Actuator Spring
54 Thrust Bearing
56 Return Springs
60 Clutch Carrier Axial Friction Surface
62 Wedge Plate Axial Friction Surface
64 Magnetic Contact Surface
70 Clutch Carrier Inward Facing Radial Friction Surface
72 Wedge Plate Outward Facing Radial Friction Surface
80 Input Shaft
82 Input Shaft Support Bearing
90 Output Shaft
92 Output Shaft Support Bearing
100 Optional Washers
AD1 Axial Direction 1
AD2 Axial Direction 2

What is claimed is:

1. A wedge clutch assembly for transferring torque from an engine to an output shaft, comprising:
    a clutch carrier operatively arranged to receive torque from the engine, the clutch carrier comprising a first axial friction surface and a first radially inwardly facing surface;
    a hub operatively arranged to non-rotatably lock with the output shaft, the hub comprising a first radially outwardly facing surface having one or more grooves positioned circumferentially thereon and one or more detents positioned within the one or more grooves, the first radially outwardly facing surface comprising a first plurality of arc surfaces;
    a wedge plate comprising at least one axial friction surface, a second radially outwardly facing surface, and a second radially inwardly facing surface having one or more recesses and a second plurality of arc surfaces, the one or more recesses operatively arranged to align with the one or more detents;
    a pressure plate concentrically arranged within the first radially inwardly facing surface and displaceable such that:
        in an engaged mode, an axial force is applied to the pressure plate, in a first axial direction, to engage the wedge plate with the clutch carrier such that torque is transferred from the engine to the output shaft; and,
        in a disengaged mode, the wedge plate is independently rotatable from the clutch carrier; and
    an actuator that provides the axial force, wherein the actuator includes
        an electromagnet having a core and a coil concentrically arranged within the core;
        an armature;
    wherein:
        in the disengaged mode, an axially disposed space separates the armature from the core; and,
        in the engaged mode, the armature is displaced in the first axial direction to abut against the core.

2. The wedge clutch assembly as recited in claim 1, wherein the clutch carrier, the hub, the wedge plate, and the pressure plate are arranged concentrically about an axis of rotation.

3. The wedge clutch assembly as recited in claim 2, wherein the wedge plate is operatively arranged to:
    displace circumferentially about the hub; and,
    non-rotatably lock with the hub.

4. The wedge clutch assembly as recited in claim 3, wherein, in the engaged mode:
the at least one axial friction surface is in contact with the first axial friction surface such that the wedge plate and the clutch carrier rotate together.

5. The wedge clutch assembly as recited in claim 4, wherein the one or more detents comprise:
one or more detent pins; and,
one or more detent springs operatively arranged to provide radially outward force to the one or more detent pins, wherein:
in the disengaged mode, the one or more detent pins protrude from the one or more grooves and engage the one or more recesses; and,
in the engaged mode, the wedge plate is displaced in a first circumferential direction to force the one or more detent pins radially inward such that the one or more pins are fully depressed within the one or more grooves.

6. The wedge clutch assembly as recited in claim 5, wherein the wedge plate is displaceable in the first circumferential direction such that the second plurality of arc surfaces lock with the first plurality of arc surfaces.

7. The wedge clutch assembly as recited in claim 6, wherein:
the wedge plate is discontinuous in a circumferential direction by at least one radially disposed space separating a first circumferential end and a second circumferential end of the wedge plate by at least one circumferential distance; and,
the first plurality of arc surfaces are arranged to interfere with the second plurality of arc surfaces to expand the wedge plate radially outward.

8. The wedge clutch assembly as recited in claim 7, wherein the actuator further comprises:
a support tube, comprising:
a first end having an axial surface, the axial surface having a concentric groove; and,
a second end having a neck;
a thrust bearing operatively arranged within the concentric groove to engage the pressure plate;
an actuator spring concentrically arranged around the neck; and,
a spring tube, comprising:
a first end concentrically arranged around the actuator spring; and,
a second end fixedly secured to the armature.

9. The wedge clutch assembly as recited in claim 8, wherein the clutch carrier, the hub, the wedge plate, the pressure plate, the thrust bearing, the support tube, the actuator spring, the spring tube, the electromagnet, and the armature are arranged concentrically about an axis of rotation.

10. The wedge clutch assembly as recited in claim 9, wherein, in the engaged mode:
an electrical current is introduced through the coil to produce a magnetic field around the core; and,
the magnetic field magnetizes the armature such that the armature is displaced in the first axial direction to abut against the core.

11. The wedge clutch assembly recited in claim 10, wherein, in the engaged mode:
the armature displaces the spring tube in the first axial direction to compress the actuator spring to displace the support tube, thrust bearing, pressure plate, and wedge plate in the first axial direction; and,
the at least one axial friction surface engages the first axial friction surface such that the wedge plate and the clutch carrier rotate together.

12. The wedge clutch assembly as recited in claim 11, further comprising a plurality of return springs operatively arranged around the core to axially engage the armature.

13. The wedge clutch assembly as recited in claim 12, wherein, in the disengaged mode:
the electrical current is suppressed to demagnetize the armature; and,
the plurality of return springs displace the armature in a second axial direction to disengage the wedge plate and the clutch carrier.

14. A wedge clutch assembly for transferring torque from an engine to an output shaft, comprising:
a clutch carrier operatively arranged to receive torque from the engine, the clutch carrier comprising a first axial friction surface and a first radially inwardly facing surface;
a hub operatively arranged to non-rotatably lock with the output shaft, the hub comprising a first radially outwardly facing surface having one or more grooves positioned circumferentially thereon and one or more detents positioned within the one or more grooves, the first radially outwardly facing surface comprising a first plurality of arc surfaces;
one or more washers axially arranged about the hub;
a wedge plate comprising at least one axial friction surface, a second radially outwardly facing surface, and a second radially inwardly facing surface having one or more recesses and a second plurality of arc surfaces, the one or more recesses operatively arranged to align with the one or more detents, the hub is concentrically arranged within the second radially inwardly facing surface;
a pressure plate concentrically arranged within the first radially inwardly facing surface and operatively arranged to non-rotatably lock to the clutch carrier and contain the wedge plate and the hub within the clutch carrier; and,
an electromagnetic actuator operatively arranged to:
in an engaged mode, apply an axial force, in a first axial direction, to the pressure plate to engage the wedge plate with the clutch carrier such that torque is transferred from the engine to the output shaft; and,
in a disengaged mode, release the axial force such that the wedge plate is independently rotatable from the clutch carrier and the pressure plate;
wherein the electromagnetic actuator comprises:
an electromagnet, comprising:
a core having a magnetic contact surface,
a plurality of springs arranged on the magnetic contact surface; and,
a coil concentrically arranged within the core;
an armature;
a support tube, comprising:
a first end having an axial surface, the axial surface having a concentric groove; and,
a second end having a neck;
a thrust bearing operatively arranged within the concentric groove to engage the pressure plate;
an actuator spring concentrically arranged around the neck; and,
a spring tube, comprising:
a first end concentrically arranged around the actuator spring; and,
a second end fixedly secured to the armature;

wherein:
in the disengaged mode, an axially disposed space separates the armature from the magnetic contact surface; and,
in the engaged mode, the armature is displaced in the first axial direction to substantially abut against the magnetic contact surface.

15. The wedge clutch assembly as recited in claim 14, wherein, in the engaged mode:
the armature displaces the spring tube in the first axial direction to compress the actuator spring to displace the support tube, thrust bearing, pressure plate, and wedge plate in the first axial direction; and,
the at least one axial friction surface engages the first axial friction surface such that the wedge plate and the clutch carrier rotate together.

16. A wedge clutch comprising:
a clutch carrier operatively arranged to receive an input torque;
a hub operatively arranged to non-rotatably lock with an output shaft, the hub having an outer surface defining one or more grooves positioned circumferentially thereon and one or more detents positioned within the one or more grooves, the outer surface defining a first plurality of arc surfaces;
a wedge plate having an inner surface defining one or more recesses and a second plurality of arc surfaces, the one or more recesses operatively arranged to align with the one or more detents;
a pressure plate concentrically arranged within the carrier;
an actuator including an armature, and an electromagnet having a core and a coil concentrically arranged within the core;
wherein:
in an engaged mode, the armature is displaced in the first axial direction to abut against the core and an axial force is applied to the pressure plate in a first axial direction to engage the wedge plate with the clutch carrier such that the input torque is transferred to the output shaft, and
in a disengaged mode, the armature is axially-spaced from the core, and the wedge plate is independently rotatable from the clutch carrier.

* * * * *